(12) United States Patent
Wollmershauser et al.

(10) Patent No.: US 9,647,974 B2
(45) Date of Patent: *May 9, 2017

(54) METHOD AND APPARATUS FOR EVENT NOTIFICATION

(71) Applicant: AT&T Intellectual Property I, L.P., Atlanta, GA (US)

(72) Inventors: Steven M. Wollmershauser, San Antonio, TX (US); Yolius Diroo, San Antonio, TX (US); Edward Walter, Boerne, TX (US); Brian Wilson, Johnston, IA (US); William R. Hurst, San Antonio, TX (US); Anil Kumar Doradla, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,641

(22) Filed: Sep. 23, 2015

(65) Prior Publication Data

US 2016/0014065 A1    Jan. 14, 2016

Related U.S. Application Data

(63) Continuation of application No. 13/606,272, filed on Sep. 7, 2012, now Pat. No. 9,172,801, which is a
(Continued)

(51) Int. Cl.
*H04L 12/66* (2006.01)
*H04L 12/58* (2006.01)
*H04L 12/18* (2006.01)
*H04M 3/487* (2006.01)
*H04L 29/08* (2006.01)
*H04W 4/00* (2009.01)
(Continued)

(52) U.S. Cl.
CPC .......... *H04L 51/20* (2013.01); *H04L 12/1895* (2013.01); *H04L 51/14* (2013.01); *H04L 67/24* (2013.01); *H04L 67/26* (2013.01); *H04M 3/4872* (2013.01); *H04M 3/42374* (2013.01); *H04M 2203/2072* (2013.01)

(58) Field of Classification Search
USPC .............................. 370/352; 455/412.1, 418
See application file for complete search history.

(56) References Cited

U.S. PATENT DOCUMENTS

2002/0068583 A1* 6/2002 Murray ................. H04M 3/432
455/456.3
2002/0184321 A1   12/2002 Fishman et al.
(Continued)

*Primary Examiner* — Muthuswamy Manoharan
(74) *Attorney, Agent, or Firm* — Chiesa, Shahinian & Giantomasi PC

(57) ABSTRACT

A method (300) and apparatus are disclosed for event notification. An apparatus that incorporates teachings of the present disclosure may include, for example, a presence services system (PSS) (102) can have a controller (104) that manages operations of a communications interface (110). The controller can be programmed to monitor (302) presence information of a plurality of communication devices of an end user operating in a communications system, and receive (316) a request from a calendar reminder system (CRS) for access to the presence information. Additional embodiments are disclosed.

20 Claims, 3 Drawing Sheets

Related U.S. Application Data continuation of application No. 11/376,697, filed on Mar. 16, 2006, now Pat. No. 8,284,760.

(51) Int. Cl.
  *H04M 3/00*  (2006.01)
  *H04M 3/42*  (2006.01)

(56) References Cited

U.S. PATENT DOCUMENTS

| | | |
|---|---|---|
| 2003/0174814 A1 | 9/2003 | Diacakis |
| 2003/0190019 A1 | 10/2003 | Chefalas et al. |
| 2004/0203659 A1 | 10/2004 | Mikan |
| 2005/0009541 A1 | 1/2005 | Ye et al. |
| 2005/0084082 A1 | 4/2005 | Horvitz et al. |
| 2005/0132006 A1 | 6/2005 | Horvitz et al. |
| 2005/0277409 A1 | 12/2005 | Etelapera |
| 2006/0052113 A1* | 3/2006 | Ophir .................. H04W 8/02 455/456.1 |
| 2006/0079260 A1* | 4/2006 | Tillet .................. H04W 4/08 455/518 |
| 2007/0027921 A1 | 2/2007 | Alvarado et al. |
| 2007/0203736 A1 | 8/2007 | Ashton |
| 2007/0214228 A1* | 9/2007 | Horvitz .............. G06Q 10/107 709/207 |

\* cited by examiner

METHOD AND APPARATUS FOR EVENT NOTIFICATION

RELATED APPLICATIONS

The present application is a continuation of prior U.S. patent application Ser. No. 13/606,272, filed Sep. 7, 2012, which is a continuation of prior U.S. patent application Ser. No. 11/376,697, filed Mar. 16, 2006, and issued as U.S. Pat. No. 8,284,760 on Oct. 9, 2012, the disclosures of which are herein incorporated by reference in their entirety.

U.S. patent application Ser. No. 11/156,240, filed Jun. 17, 2005, by Divine et al., entitled "Method, System, and Article for Telephone Notification of an Online Status of a User," incorporated herein by reference in its entirety.

U.S. patent application Ser. No. 11/352,642, filed Feb. 13, 2006, by Walter, entitled "Method and Apparatus for Synthesizing Presence Information," incorporated herein by reference in its entirety.

FIELD OF THE DISCLOSURE

The present disclosure relates generally to notification techniques, and more specifically to a method and apparatus for event notification.

BACKGROUND

With the increased use of various calendar and personal digital assistant (PDA) tools, schedule notifications or reminders have also increased in use. However, such systems rely on the host device, such as the computer or PDA to issue the alert—for example, preset reminder messages that are prompted to a computer screen by Microsoft Outlook™ or other similar calendar systems. While this is useful at times when the user is in close proximity to the PDA or computer, it does not fully integrate a person's notification of calendar and schedule in environments away from these devices.

A need therefore arises for a method and apparatus for event notification.

DETAILED DESCRIPTION

Embodiments in accordance with the present disclosure provide a method and apparatus for event notification.

In a first embodiment of the present disclosure, a computer-readable storage medium can have computer instructions for detecting a calendar reminder event with associated calendar event data, transmitting to a presence services system (PSS) a request for presence information associated with an end user having a plurality of communication devices, and receiving from the PSS synthesized presence information corresponding to the end user, selecting one of the communication devices according to the synthesized presence information, and transmitting to the selected communication device a notice associated with the calendar reminder event.

In a second embodiment of the present disclosure, a presence services system (PSS) can have a controller that manages operations of a communications interface. The controller can be programmed to monitor presence information of a plurality of communication devices of an end user operating in a communications system, and receive a request from a calendar reminder system (CRS) for access to the presence information.

In a third embodiment of the present disclosure, a computer-readable storage medium in a communication device can have computer instructions for receiving a calendar reminder event notice from a calendar reminder system (CRS) that has selected the communication device according to presence information associated the communication device.

In a fourth embodiment of the present disclosure, a computer-readable storage medium can have computer instructions for monitoring presence information of a plurality of communication devices of an end user operating in a communications system, detecting a calendar reminder event with associated calendar event data, selecting one of the communication devices according to the presence information, and transmitting to the selected communication device a notice associated with the calendar reminder event.

Figure 1:
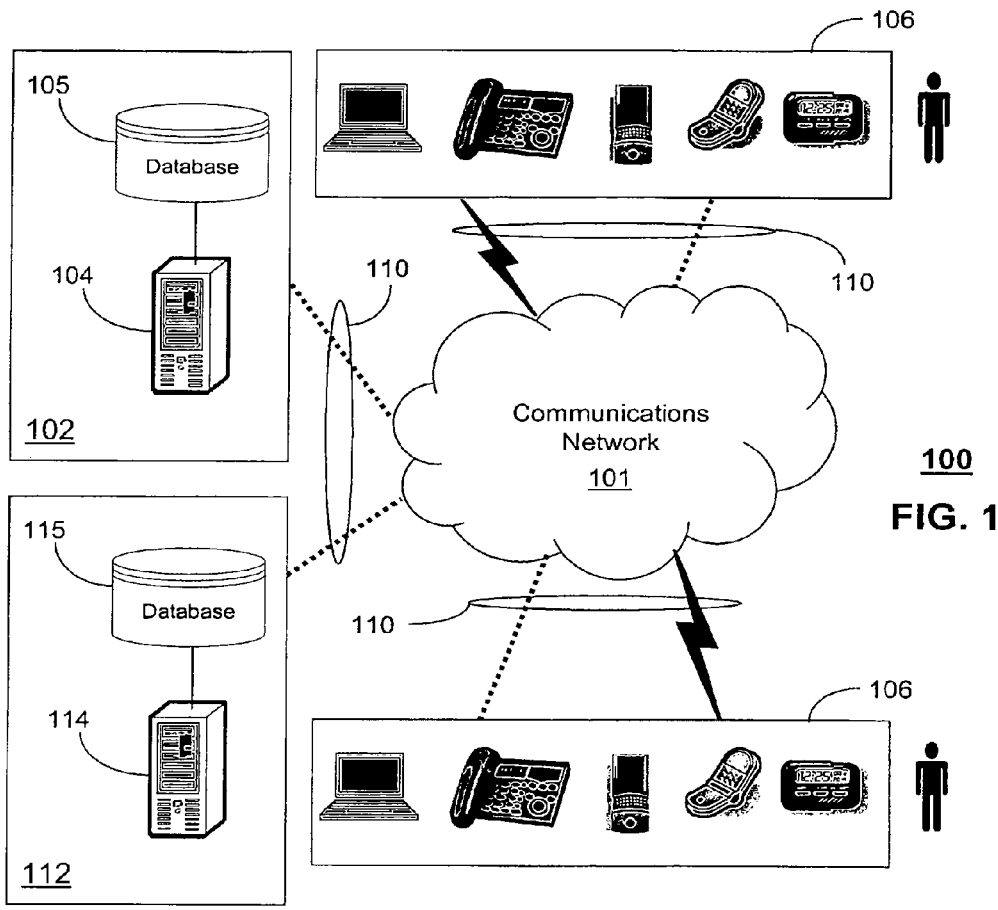
FIG. 1 depicts an exemplary embodiment of a calendar reminder system (CRS) and a presence services system (PSS) managing calendar event data and presence information for a number of communication devices (CDs) operating in a communication system.

FIG. 1 depicts an exemplary embodiment of a calendar reminder system (CRS) 112 and a presence services system (PSS) 102 managing calendar event data and presence information for a number of communication devices (CDs) 106 operating in a communication system 100. The PSS 102 and the CRS 112 can comprise a communications interface 110, a memory 105, 115 and a controller 104, 114. The communications interface 110 can use common wired or wireless communications technology for interfacing to a communications network 101 that can support circuit switched and/or a packet switched communications. The controllers 104, 114 can be represented by any computing device such as a laptop computer, desktop computer, or scalable server. The memories 105, 115 can utilize common volatile and nonvolatile storage media components such as a high capacity disk drive, RAM and Flash memory, and can be managed in part by a common database application according to the present disclosure.

The PSS 102 can perform the function of monitoring and synthesizing presence information relating to the CDs 106. The synthesized presence information can in turn be shared with the CRS 112 which utilizes said information to communicate calendar events to a select one or more of the CDs 106. The CRS 112 can represent an independently operating exchange server that manages end user contact information, email and calendar events. Alternatively, the CRS 112 can be an integral part of the PSS 102. In this embodiment, both the presence monitoring functions and the calendar event functions operate in the same device. In yet another embodiment, the CRS 112 can be an integral part of one of the CDs 106 such as an email client (e.g., Microsoft Outlook™) operating in a laptop or desktop computer.

Given the various embodiments possible, it would be evident to an artisan with ordinary skill in the art that the functions of the PSS 102, the CRS 112, and the CD 106 can be interchanged or merged between said devices without departing from the scope of the present disclosure.

The communications network 101 can offer the CDs 106 Internet and/or traditional services such as, for example, POTS (Plain Old Telephone Service), VoIP (Voice over Internet communications, IPTV (Internet Protocol Television), broadband communications, cellular telephony, as well as other known or next generation access technologies.

The CDs 106 can be represented by any number of embodiments including, for example, a laptop or desktop computer, a telephone managed by a base unit (such as a cordless POTS phone), a personal digital assistance (PDA), a cellular phone, or paging device. Some or all of these devices can interface to the communication network 101 with a wired or wireless interface. For example, the laptop can be interconnected to the communications network 101 by a wired Ethernet port to a DSL (Digital Service Line) interface in a residence or enterprise, or by a WiFi or WiMAX wireless connection. The telephone and base unit can utilize cordless 2.4 GHz or 5.8 GHz technology for short-range roaming, and can interface to the communications network using POTS or VoIP communications. The PDA and cellular phone can support common wireless access technologies for interfacing to the communications network 101. Any number of the aforementioned CDs 106 can also be combined so as to create a multifunctional communication device. For example, VoIP, paging, email and calendaring, and cellular communication functionality can be integrated into the PDA.

Figure 2:
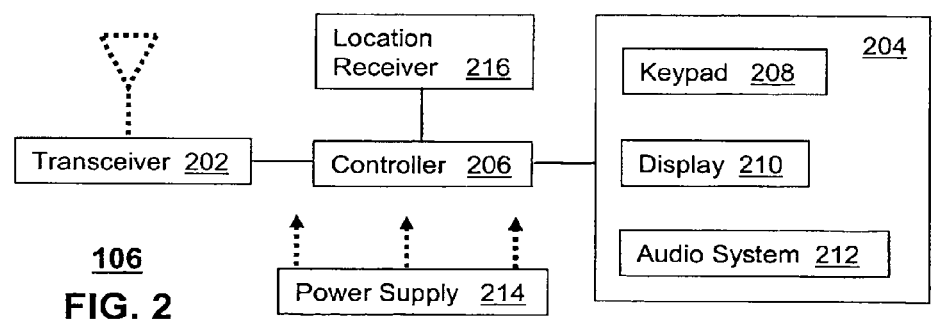
FIG. 2 depicts an exemplary block diagram of the CDs.

FIG. 2 depicts an exemplary embodiment of the CD 106. Each CD 106 can comprise a wired and/or wireless transceiver 202, a user interface (UI) 204, a power supply 214, and a controller 206 for managing operations thereof. In an embodiment where the CDs 106 operate in a landline environment, the transceiver 202 utilizes common wireline access technology to support POTS, IP, and/or VoIP services. In a wireless communications setting, the transceiver 202 can utilize common technologies to support singly or in combination any number of wireless access technologies including without limitation cordless telephony, Bluetooth™, Wireless Fidelity (WiFi), Worldwide Interoperability for Microwave Access (WiMAX), Ultra Wide Band (UWB), software defined radio (SDR), and cellular access technologies such as CDMA-IX, W-CDMA/HSDPA, GSM/GPRS, TDMA/EDGE, and EVDO. SDR can be utilized for accessing a public or private communication spectrum according to any number of communication protocols that can be dynamically downloaded over-the-air to the CD 106. Other next generation wireless access technologies can also be applied to the present disclosure.

The UI 204 can include a keypad 208 with depressible or touch sensitive navigation disk and keys for manipulating operations of the CD 106. The UI 204 can further include a display 210 such as monochrome or color LCD (Liquid Crystal Display) for conveying images to the end user of the CD 106, and an audio system 212 that utilizes common audio technology for conveying and intercepting audible signals of the end user.

The power supply 214 can utilize common power management technologies such as replaceable batteries, supply regulation technologies, and charging system technologies for supplying energy to the components of the CD 106 and to facilitate portable applications. In stationary applications, the power supply 214 can be modified so as to extract energy from a common wall outlet and thereby supply DC power to the components of the CD 106.

The controller 206 can utilize computing technologies such as a microprocessor and/or digital signal processor (DSP) with associated storage memory such a Flash, ROM, RAM, SRAM, DRAM or other like technologies for controlling operations of the aforementioned components of the CD 106. In a supplemental embodiment, the CD 106 can include a location receiver 216 such as a common GPS (Global Positioning System) receiver that can intercept satellite signals and therefrom determine a location fix of the communication device.

Figure 3:
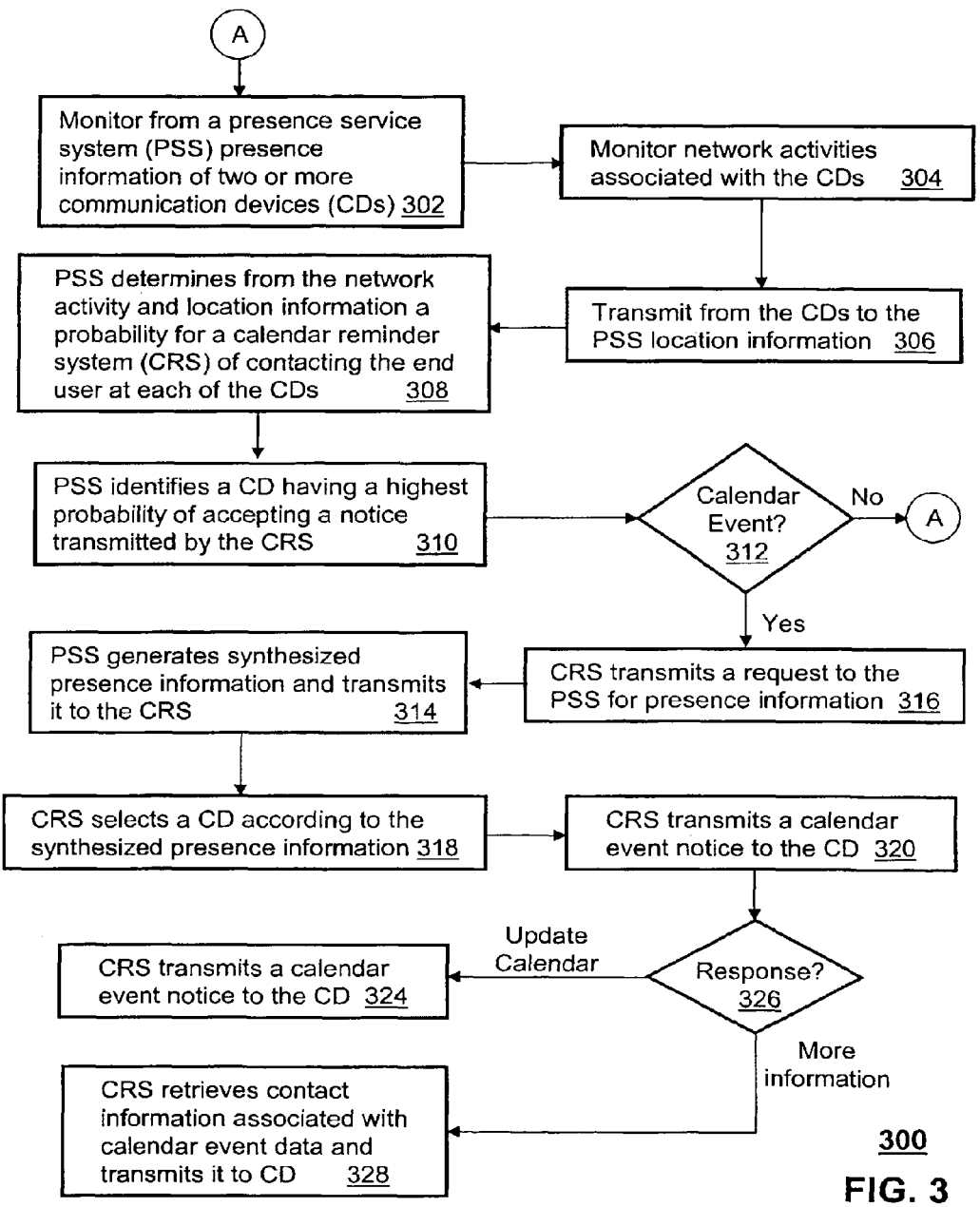
FIG. 3 depicts an exemplary method operating in the CRS, the PSS and the CDs.

FIG. 3 depicts an exemplary method operating in the CRS 112, the PSS 102 and the CDs 106. Method 300 begins with step 302 where the PSS 102 monitors presence information of a number of CDs 106 carried by the end user. The presence information can be derived each time the CD 106 authenticates itself with the communications network 101. The presence traffic can be in the form of XML (Extensible Markup Language), SIP (Session Initiation Protocol), or other present or next generation protocols which support the exchange of presence information. The PSS 102 can also be programmed to monitor in step 304 network activities associated with the end user's CDs 106.

In step 304, the PSS 102 can monitor, for example, roaming information, and egress or ingress data traffic associated with each CD 106. The roaming information can for instance indicate that the end user is roaming from one cellular tower to another or from one WiFi access point to another. With common triangulation techniques, the PSS 102 can be programmed to determine the whereabouts of the end user, as well as make a prediction as to which of the CDs 106 the end user is carrying, and which may have been left at home or in the office.

The ingress and egress traffic can also provide an indication of real-time and frequency of use of each of the CDs 106. With the foregoing information the PSS 102 can thus hone in on the end user's behavior, location and availability, and thereby derive synthesized presence information. In step 306 the monitored CD 106 can be programmed to periodically transmit to the PSS 102 location information processed by the location receiver 216. The PSS 102 can utilize the location information to more precisely determine the whereabouts and availability of the end user for receiving messages from the CRS 112.

From the information gathered in steps 302-306, the PSS 102 can be programmed in step 308 to determine a probability for the CRS 112 to contact the end user by way of each of the CDs 106. The network activities can indicate, for example, that the end user's cellular phone is roaming in which case the PSS 102 can, for example, establish a probability that shows it is more likely the end user can be reached on his cell phone, than on his laptop or desktop computer. The probability calculations of step 308 can be determined according to any known or next generation statistical or analytical formulation (such as linear regression). From the probabilities determined in step 308, the PSS 102 can be programmed to identify in step 310 a CD 106 having the highest probability of contacting the end user upon receiving a message from the CRS 112. In cases where the probability differences are high and marginally the same for multiple CDs 112, step 310 can identify more than one device.

In step 312, the CRS 112 checks for a calendar reminder event. The calendar reminder event can be generated by an email client such as Microsoft Outlook™, Lotus Notes™, or other common software applications. If no events have been triggered, steps 302-310 are repeated. If an event is detected, the CRS 112 proceeds to step 316 where it transmits a request to the PSS 102 for presence information relating to the end user. As noted earlier, if the PSS 102 and the CRS 112 are integrated, this transmission step can represent a logical exchange of requests and data between the functions of the PSS 102 and the CRS 112. In step 314, the PSS 102 generates synthesized presence information and transmits it to the CRS 112. The synthesized presence information is derived from the presence information monitored in steps 302-308 and can provide the CRS 112 useful information such as the end user's whereabouts, an identity of the one or more CDs 106 being used by the end user at the time when the request for presence information is made by the CRS, one or more CDs 106 having the highest probability for the end user to accept messages from the CRS, and so on.

In step 318 the CRS 112 selects at least one of the CDs 106 according to the synthesized presence information and transmits in step 320 a notice corresponding to the calendar reminder event detected in step 312. The notice can be a text message or a voice message including at least a portion of the event data associated with the calendar reminder event (e.g., "Need to meet Mr. Jones for lunch at noon. Bring with you the company's marketing collateral."). The text message can be transmitted according to a common message type such as an email, a short message service (SMS), or an alphanumeric page.

Alternatively, the CRS 112 can be programmed to operate a common interactive voice response (IVR) system for transmitting synthesized or prerecorded voice messages to the end user of the selected CD 106. In this embodiment, the CRS 112 can be programmed to dial a telephone number of the selected CD 106 and deliver the voice message in response to an acceptance of the call by the end user of CD. The phone call can also submit a caller ID of the CRS 112 which provides a means to generate a distinctive ring at the CD 106 identifying the call as a calendar reminder event. Alternatively, the CRS 112 can be programmed to interact with the communications network 101 so as to cause the distinctive ring on the selected CD 106 without a caller ID. In yet another embodiment, the CRS 112 can be programmed to transmit the voice message over the communication 101 to the selected CD 106 as an email with an enclosure containing a voice message recording corresponding to the calendar event data.

In step 326, the CRS 112 can be programmed to accept responses from the end user of the CD 106. The responses can correspond to a request for updating the calendar reminder event, and/or a request for more information. The responses can be received in any number of message formats such as, for example, an email response, a voice response, a response to the SMS, a keyed response such as Dual Tone Multi-Frequency (DTMF) key strokes inputted by the end user by way of the keypad 208, and so on.

A calendar update can represent, for example, a snooze response, a reschedule response, a delete response, or a dismiss response. Any one of these updates can be processed by the CRS 112 in step 324. A snooze function can be useful when the calendar reminder event occurs before a time for the actual event (e.g., 15 minutes prior). The snooze response can for instance result in the calendar reminder event being reprogrammed to trigger at a time given in the response (e.g., 5 minutes before the actual calendar event). In an embodiment where the CRS 112 operates an IVR application, the CRS 112 can verbally provide the end user several snooze options to choose from (e.g., 10 mins, 5 mins, 0 mins). The end user can in turn submit DTMF and/or verbal response to select a snooze time. In a similar manner, the end user can reschedule the calendar reminder by interacting with the IVR (e.g., change the calendar reminder to a new time or day), delete the calendar reminder, or dismiss it. For each of cases, the CRS 112 updates the calendar reminder event in step 324.

Singly or in combination with the foregoing steps of updating the calendar reminder event, the CRS 112 can be programmed to retrieve and transmit in step 328 to the CD 106 additional information requested by its end user. Such information can be for instance contact information of one or more parties (phone numbers, addresses, etc.) associated in some manner with the calendar event notice transmitted in step 320. Although likely, it is not necessary for the end user to select contact information having a relation with the calendar reminder event. The end user has full discretion to request any information that may be relevant to the end user at the time of the request. As before, the request for additional information can be submitted by the end user by way of the IVR operating in the CRS 112 or other communication means (e.g., email response, SMS response, etc.).

Method 300 describes a number of embodiments in which calendar reminder events can be transmitted to a CD 106 having a high likelihood of being accepted by the end user. Said method also provides several embodiments for updating the calendar reminder event and for requesting additional information responsive to the end user's needs. It would be evident to an artisan with ordinary skill in the art that these embodiments can be modified, reduced, or enhanced without departing from the scope and spirit of the claims described below.

For example, before a calendar reminder event notice is transmitted, the end user of the CD 106 may desire to update the calendar reminder event before it actually triggers in response to a change in circumstances known to the end user. In this case, a calendar update can be submitted by the CD 106 as directed by the end user to the CRS 112 to make said update prior to allowing a calendar event previously programmed to by the end user to trigger. Alterations such as this that can be made to method 300 in an order different from what is presented in FIG. 3 without departing from the scope of the claims. The reader is therefore directed to the claims for the fullest understanding of the breadth and scope of the present disclosure.

Figure 4:
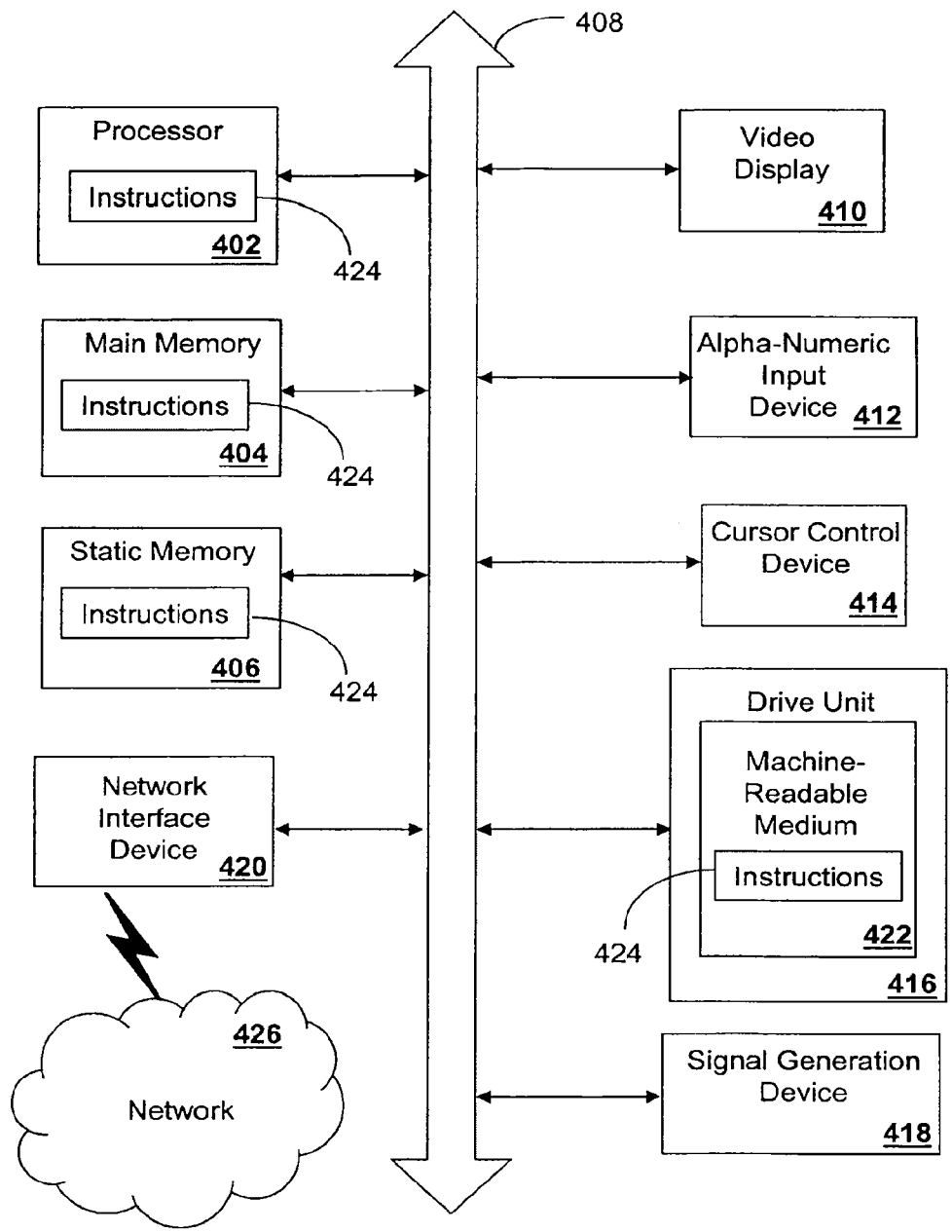
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
detecting, by a calendar reminder system, calendar event data associated with a user having a plurality of communication devices;
transmitting, by the calendar reminder system, to a presence services system a first request for presence information associated with the user;
receiving the presence information from the presence services system, the presence information synthesized according to behavior of the user, availability of the user, roaming information, one of ingress and egress traffic information, and location information received by the presence services system from one of the plurality of communication devices;
selecting, by the calendar reminder system, a particular communication device from the plurality of communication devices according to the presence information received from the presence services system, the presence information identifying the particular communication device as having a highest probability, compared to probabilities for each of the other of the plurality of communication devices, of contacting the user upon receiving a notice associated with the calendar event data, the probabilities based on the behavior of the user, the availability of the user, the roaming information, the one of ingress and egress traffic information, and the location information; and
transmitting, by the calendar reminder system, the notice to the particular communication device.

2. The method of claim 1, wherein the calendar event data specifies a scheduled event and a party associated with the scheduled event.

3. The method of claim 2, further comprising:
receiving, by the calendar reminder system, from the user a second request comprising a request for updating the scheduled event and a request for contact information of the party associated with the scheduled event.

4. The method of claim 3, further comprising:
updating, by the calendar reminder system, the scheduled event;
retrieving, by the calendar reminder system, the contact information of the party associated with the scheduled event; and
transmitting, by the calendar reminder system, the contact information to the particular communication device.

5. The method of claim 3, wherein the receiving from the end user a second request further comprises receiving a response from the end user to the notice, and wherein the response further comprises a snooze response.

6. The method of claim 1, wherein the notice comprises a text message, and wherein the method further comprises generating the text message according to the calendar event data.

7. The method of claim 1, wherein the notice comprises a voice message, and wherein the method further comprises generating the voice message according to the calendar event data.

8. An apparatus comprising:
a processor; and
a memory to store computer program instructions, the computer program instructions when executed by the processor cause the processor to perform operations comprising:
detecting calendar event data associated with a user having a plurality of communication devices;
transmitting to a presence services system a first request for presence information associated with the user;
receiving the presence information from the presence services system, the presence information synthesized according to behavior of the user, availability of the user, roaming information, one of ingress and egress traffic information, and location information received by the presence services system from one of the plurality of communication devices;
selecting a particular communication device from the plurality of communication devices according to the presence information received from the presence services system, the presence information identifying the particular communication device as having a highest probability, compared to probabilities for each of the other of the plurality of communication devices, of contacting the user upon receiving a notice associated with the calendar event data, the probabilities based on the behavior of the user, the availability of the user, the roaming information, the one of ingress and egress traffic information, and the location information; and
transmitting the notice to the particular communication device.

9. The apparatus of claim 8, wherein the calendar event data specifies a scheduled event and a party associated with the scheduled event.

10. The apparatus of claim 9, further comprising:
receiving from the user a second request comprising a request for updating the scheduled event and a request for contact information of the party associated with the scheduled event.

11. The apparatus of claim 10, further comprising:
updating the scheduled event;
retrieving the contact information of the party associated with the scheduled event; and
transmitting the contact information to the particular communication device.

12. The apparatus of claim 10, wherein the receiving from the end user a second request further comprises receiving a response from the end user to the notice, and wherein the response further comprises a snooze response.

13. The apparatus of claim 8, wherein the notice comprises a text message, and wherein the method further comprises generating the text message according to the calendar event data.

14. The apparatus of claim 8, wherein the notice comprises a voice message, and wherein the method further comprises generating the voice message according to the calendar event data.

15. A non-transitory computer readable medium storing computer program instructions, which, which executed by a processor, cause the processor to perform operations comprising:
detecting calendar event data associated with a user having a plurality of communication devices;
transmitting to a presence services system a first request for presence information associated with the user;
receiving the presence information from the presence services system, the presence information synthesized according to behavior of the user, availability of the user, roaming information, one of ingress and egress traffic information, and location information received by the presence services system from one of the plurality of communication devices;

selecting a particular communication device from the plurality of communication devices according to the presence information received from the presence services system, the presence information identifying the particular communication device as having a highest probability, compared to probabilities for each of the other of the plurality of communication devices, of contacting the user upon receiving a notice associated with the calendar event data, the probabilities based on the behavior of the user, the availability of the user, the roaming information, the one of ingress and egress traffic information, and the location information; and transmitting the notice to the particular communication device.

16. The non-transitory computer readable medium of claim 15, wherein the calendar event data specifies a scheduled event and a party associated with the scheduled event.

17. The non-transitory computer readable medium of claim 16, further comprising:

receiving from the user a second request comprising a request for updating the scheduled event and a request for contact information of the party associated with the scheduled event.

18. The non-transitory computer readable medium of claim 17, further comprising:

updating the scheduled event;

retrieving the contact information of the party associated with the scheduled event; and transmitting the contact information to the particular communication device.

19. The non-transitory computer readable medium of claim 17, wherein the receiving from the end user a second request further comprises receiving a response from the end user to the notice, and wherein the response further comprises a snooze response.

20. The non-transitory computer readable medium of claim 15, wherein the notice comprises a text message, and wherein the method further comprises generating the text message according to the calendar event data.

* * * * *